H. J. RUFLI.
APPARATUS FOR PREPARING PAVING MATERIAL.
APPLICATION FILED FEB. 23, 1909.
990,782.
Patented Apr. 25, 1911.
10 SHEETS—SHEET 1.
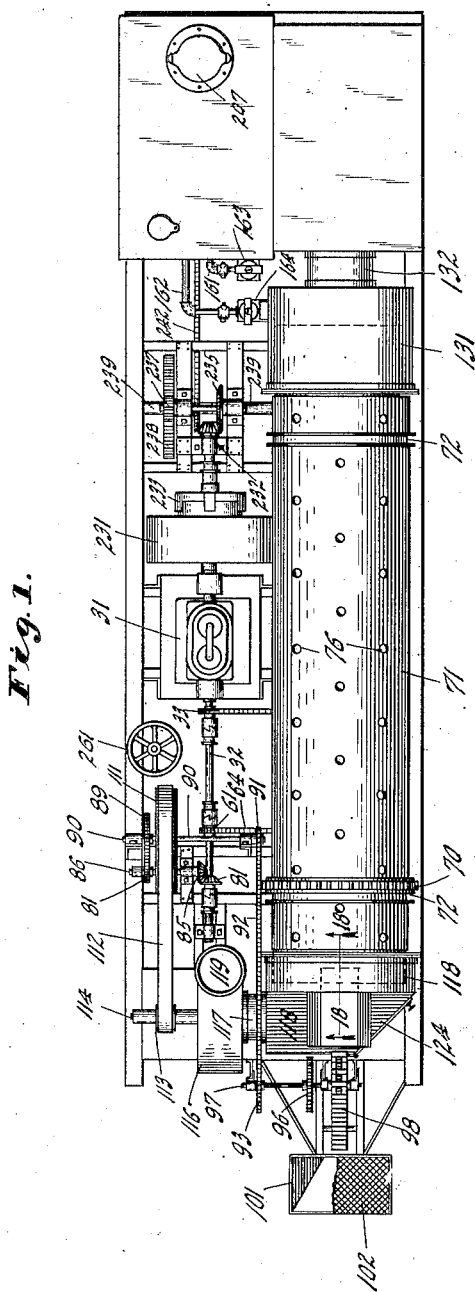
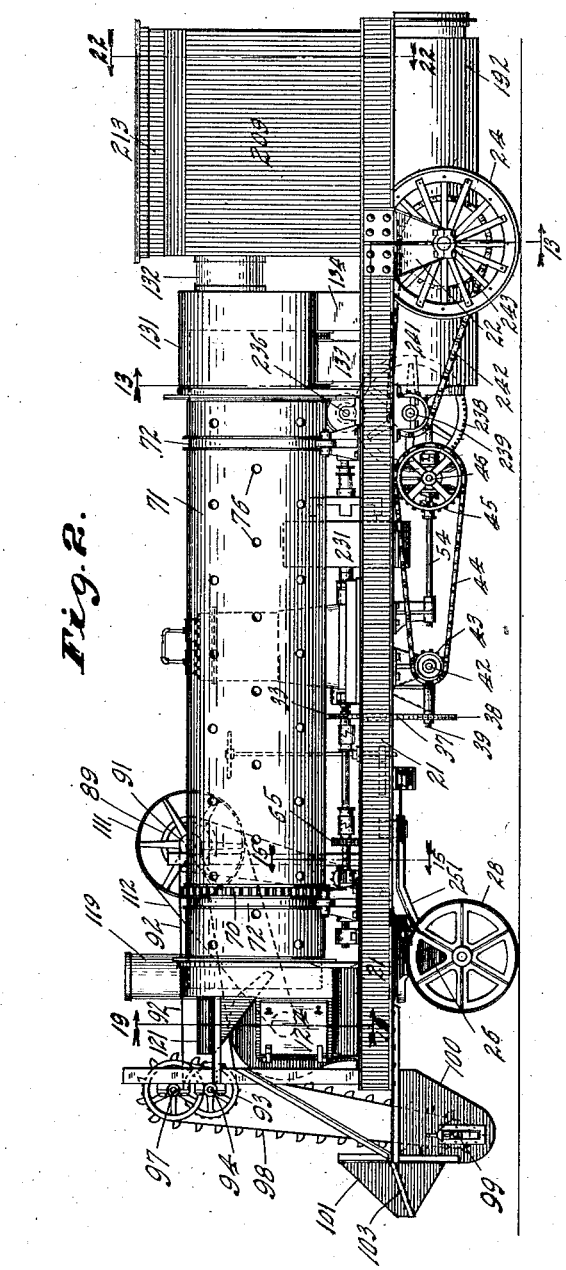
Witnesses
Frank A. Fahl
Thomas W. McMeans
Inventor
Herman J. Rufli,
By Bradford & Hood
Attorneys H. J. RUFLI.
APPARATUS FOR PREPARING PAVING MATERIAL.
APPLICATION FILED FEB. 23, 1909.
Patented Apr. 25, 1911.
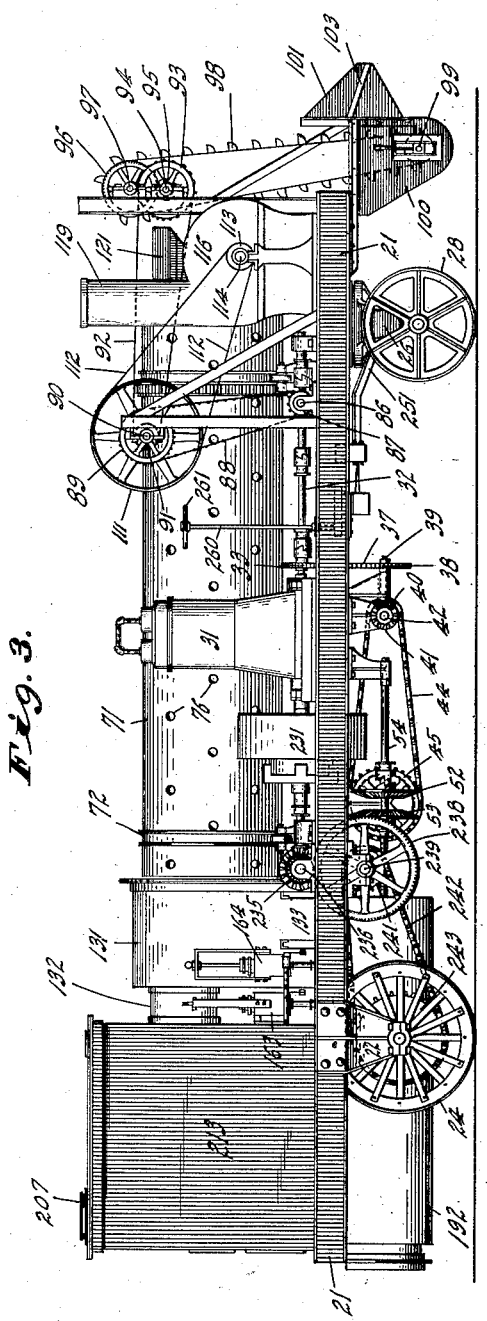
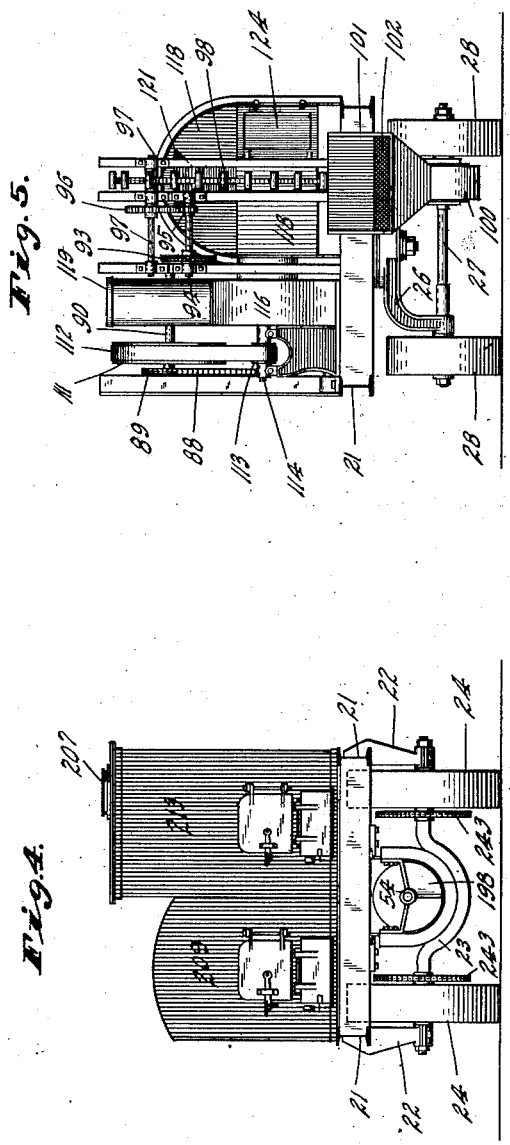

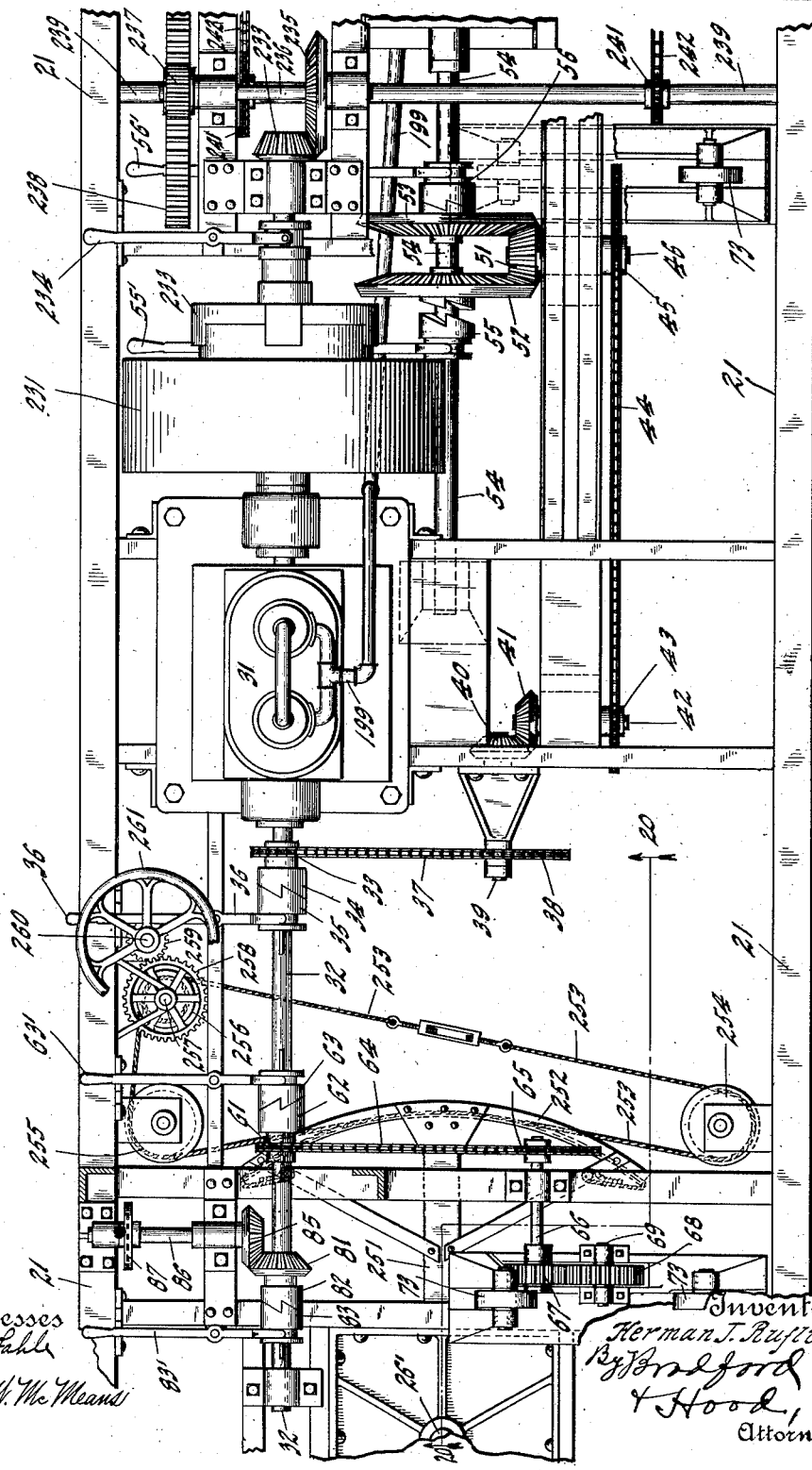

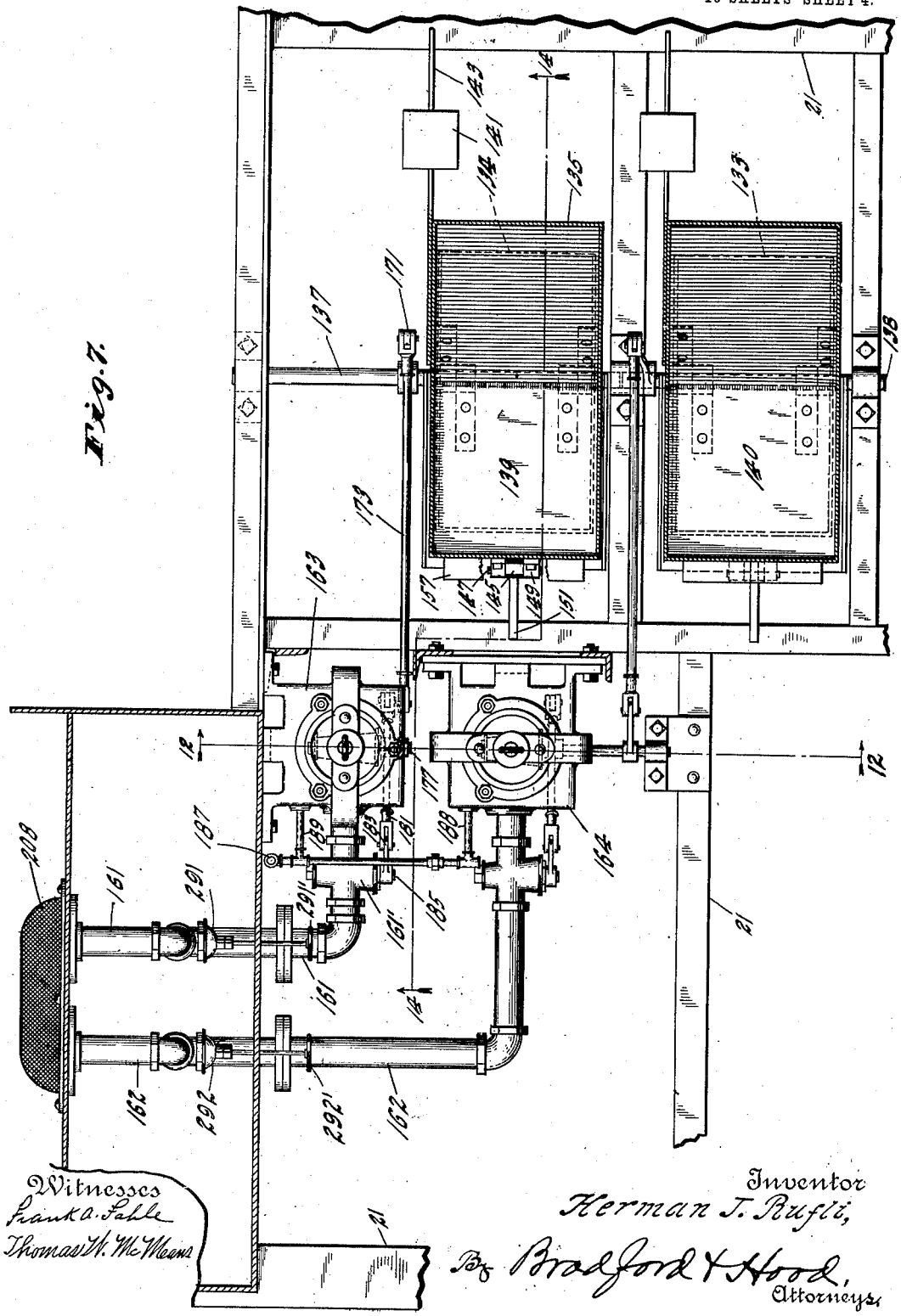

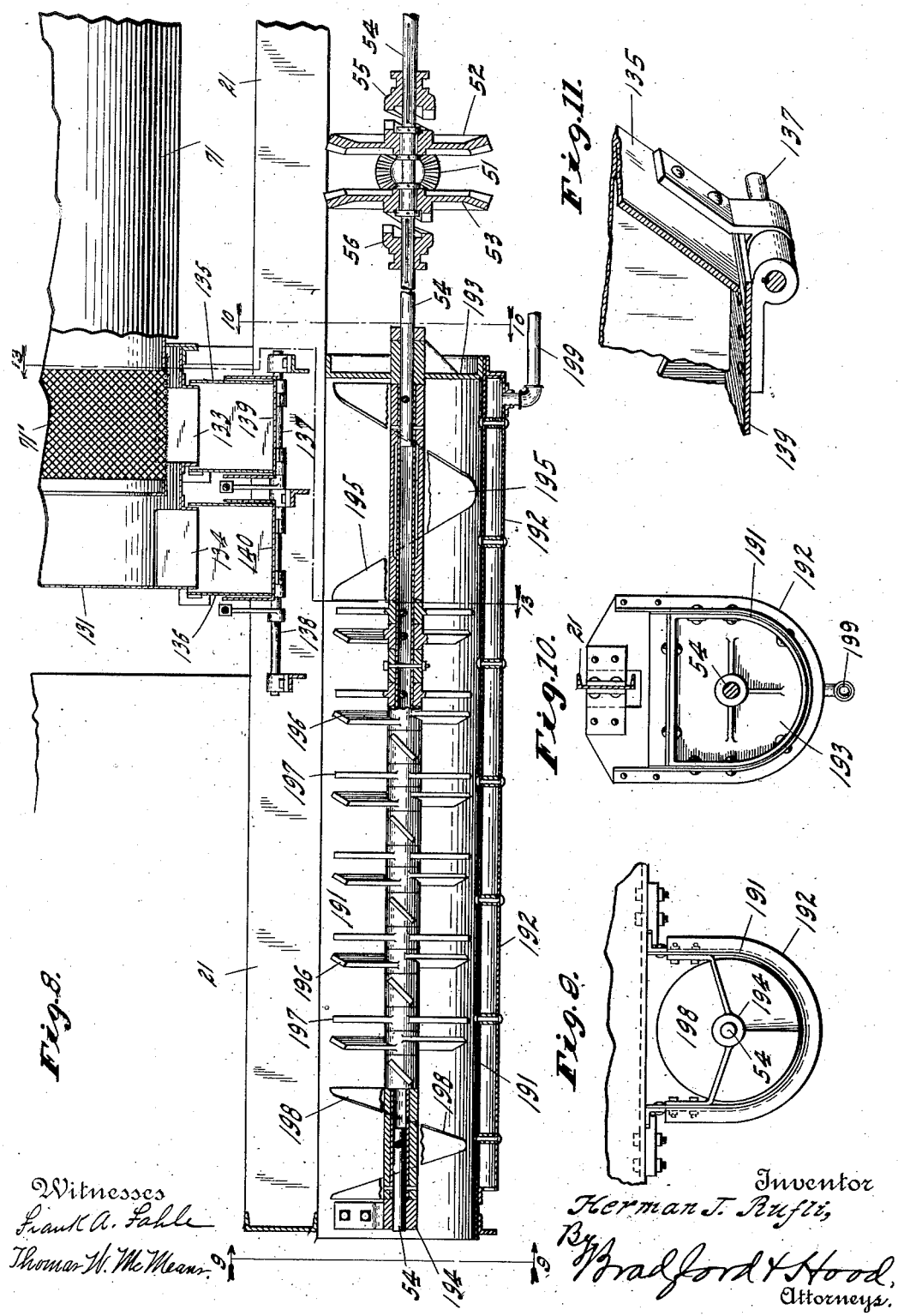

H. J. RUFLI.
APPARATUS FOR PREPARING PAVING MATERIAL.
APPLICATION FILED FEB. 23, 1909.
990,782.
Patented Apr. 25, 1911.
10 SHEETS—SHEET 6.
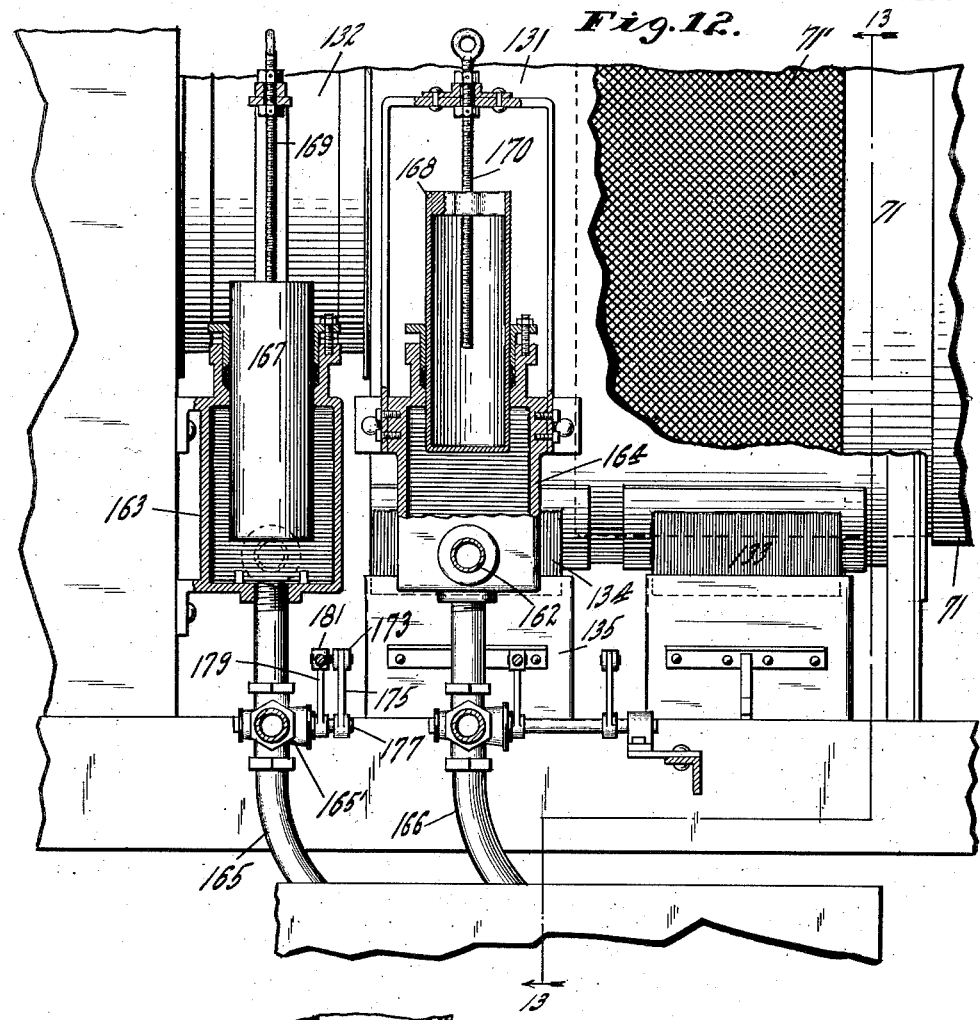
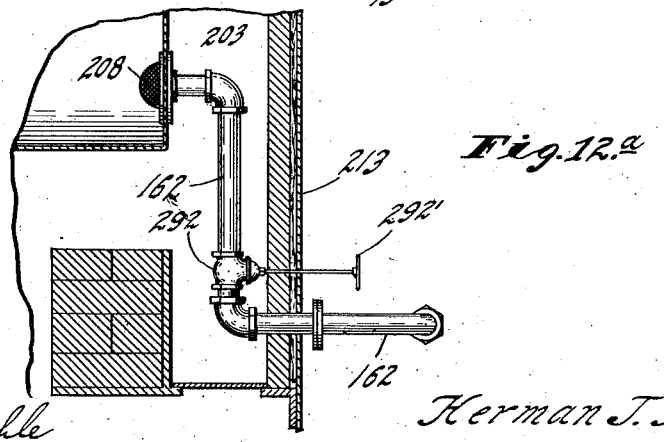

H. J. RUFLI.
APPARATUS FOR PREPARING PAVING MATERIAL.
APPLICATION FILED FEB. 23, 1909.

990,782.

Patented Apr. 25, 1911.
10 SHEETS—SHEET 7.

H. J. RUFLI.
APPARATUS FOR PREPARING PAVING MATERIAL.
APPLICATION FILED FEB. 23, 1909.
990,782.
Patented Apr. 25, 1911.
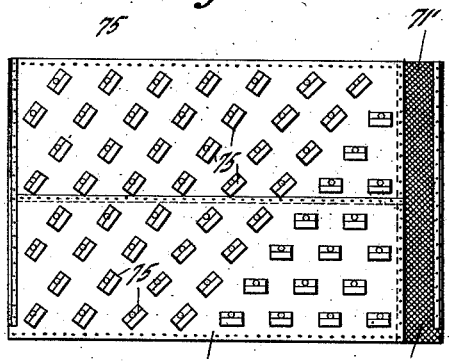
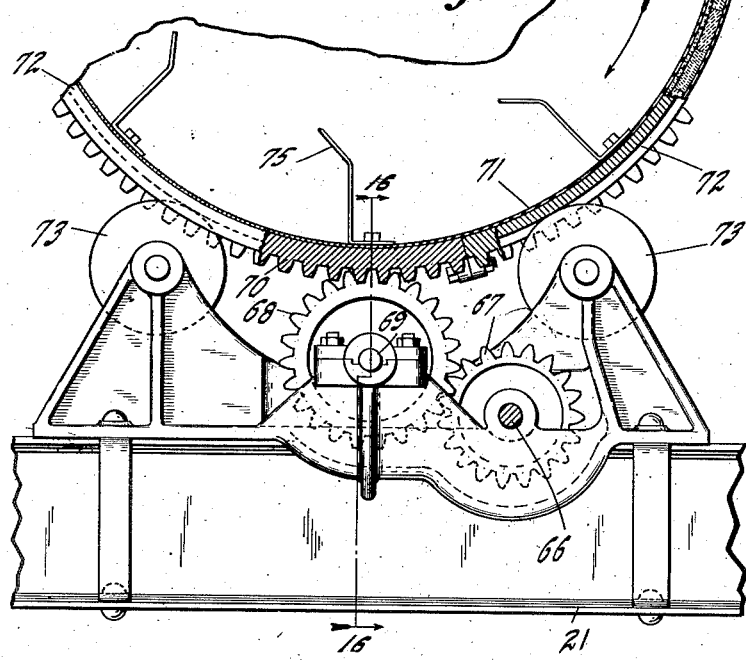
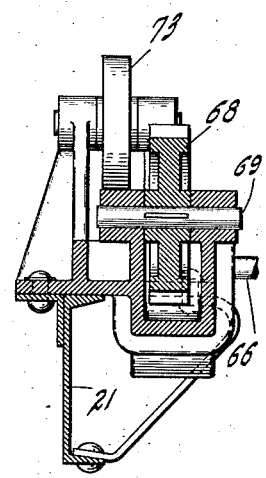
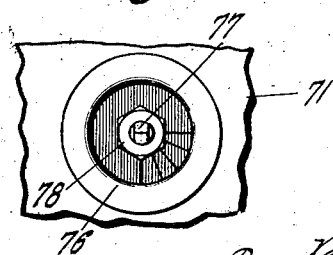

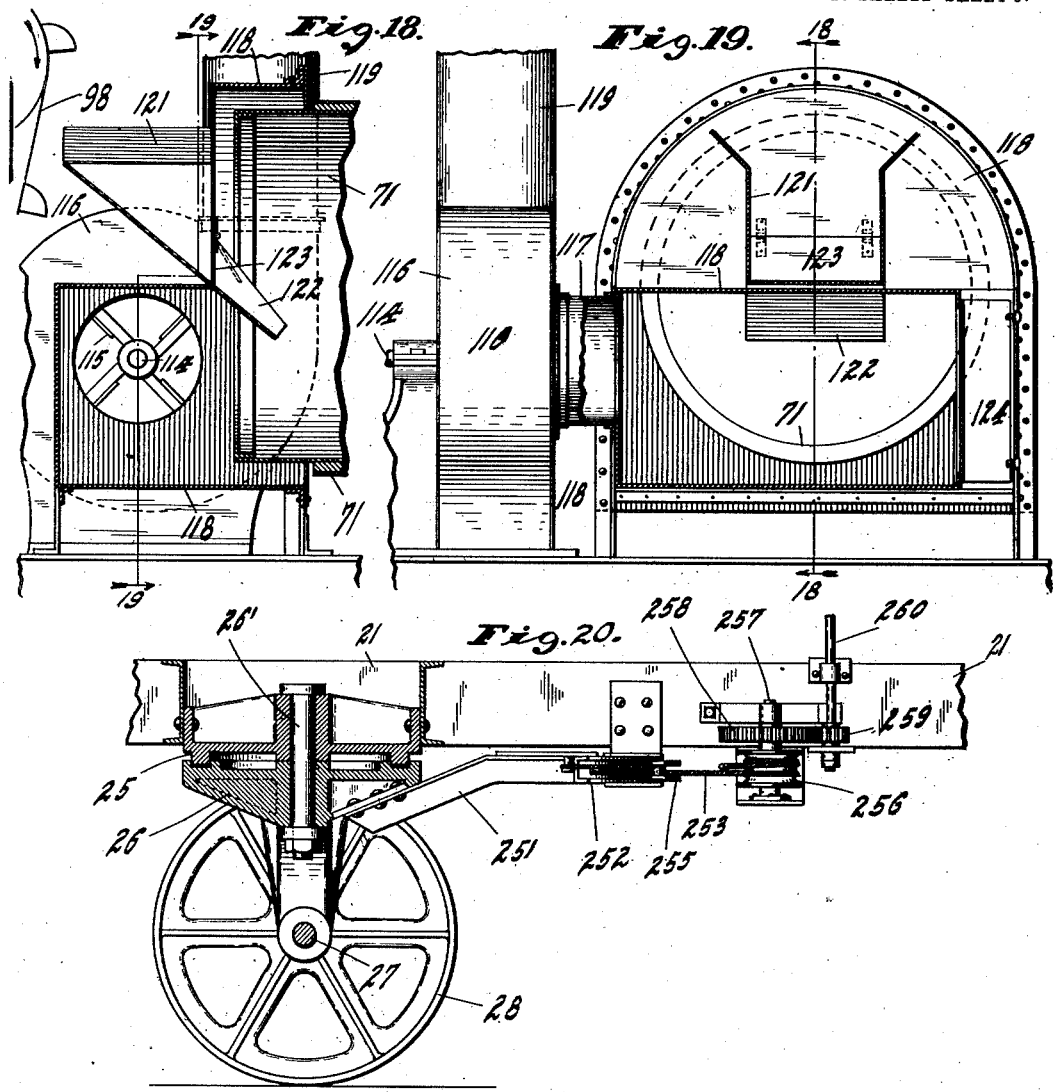

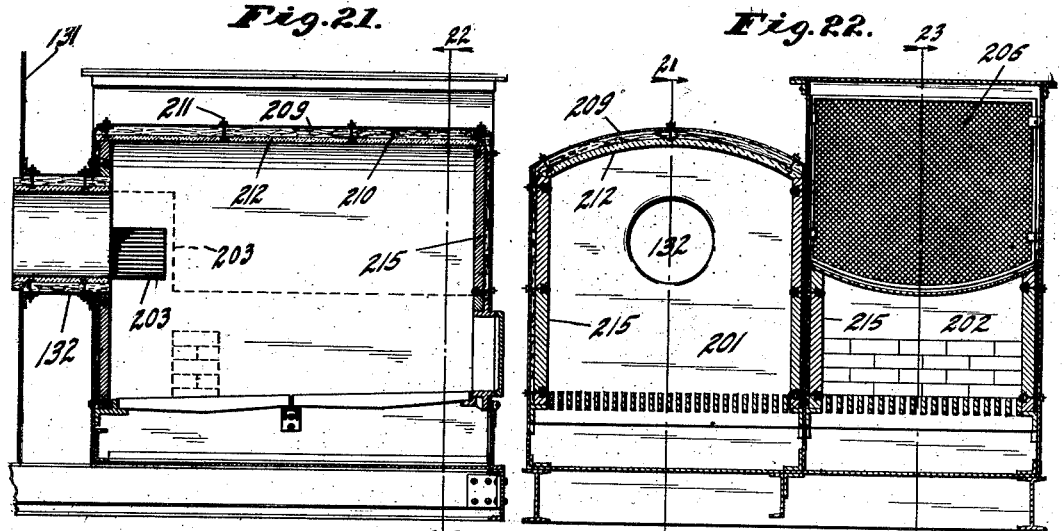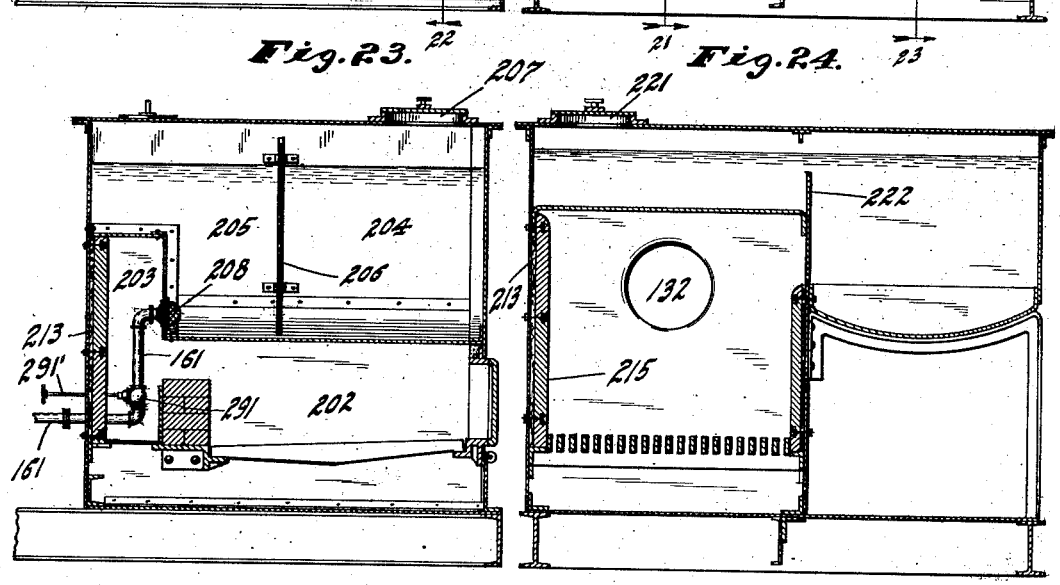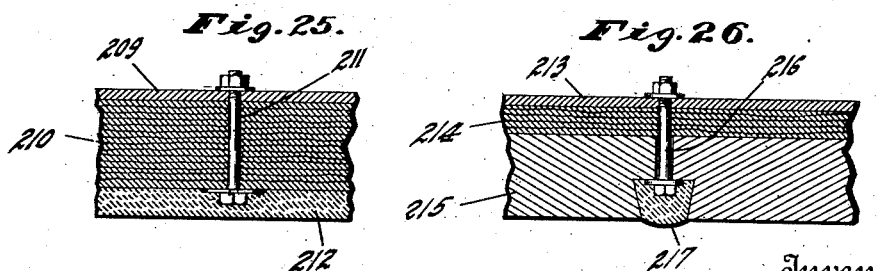

UNITED STATES PATENT OFFICE.

HERMAN J. RUFLI, OF INDIANAPOLIS, INDIANA, ASSIGNOR TO THE AMERICAN PAVING AND MANUFACTURING COMPANY OF INDIANAPOLIS, OF INDIANAPOLIS, INDIANA, A CORPORATION OF INDIANA.

APPARATUS FOR PREPARING PAVING MATERIAL.

990,782.     Specification of Letters Patent.     Patented Apr. 25, 1911.

Application filed February 23, 1909. Serial No. 479,580.

*To all whom it may concern:*

Be it known that I, HERMAN J. RUFLI, a citizen of the United States, residing at Indianapolis, in the county of Marion and State of Indiana, have invented certain new and useful Improvements in Apparatus for Preparing Paving Material, of which the following is a specification.

In the operation of preparing that sort of street paving material which consists mainly of sand and gravel and a bituminous binder, it is necessary that the sand and gravel shall be heated, the bituminous material separately melted, and the two then brought together and mixed in proper proportions, and afterward delivered to be spread upon the surface of the street. It is obviously of advantage that these several operations shall be carried on at one and the same time, and that a single apparatus, capable of being conveniently moved from place to place, shall be provided for the purpose.

The principal objects of my present invention are to produce a machine or apparatus by means of which the several operations of drying, melting, mixing and delivering paving material of the character in question may be adequately and continuously performed, and which machine or apparatus shall also be portable and self-propelled.

A machine embodying my said invention will be first fully described and the novel features thereof then pointed out in the claims.

Referring to the accompanying drawings, which are made a part hereof, and on which similar reference characters indicate similar parts, Fig. 1 is a top or plan view of a machine or apparatus embodying my said invention; Fig. 2 a side elevation of one side thereof; Fig. 3 a side elevation of the other side; Fig. 4 a rear end elevation; Fig. 5 a front end elevation; Fig. 6 a detail plan view of so much thereof as embodies the greater part of the operating mechanism, the drying cylinder being removed; and some parts broken away, for purposes of clearer illustration; Fig. 7 a horizontal sectional view as seen when looking downwardly in the direction indicated by the arrows from the position indicated by the line 7—7 in Fig. 13; Fig. 8 a detail longitudinal vertical sectional view as seen when looking in the direction indicated by the arrows from the broken line 8 8 in Fig. 13; Fig. 9 an end elevation of the delivery end of the mixer as seen when looking in the direction indicated by the arrows from the broken line 9 9 alongside Fig. 8; Fig. 10 an end elevation of the receiving end of the mixer and immediately adjacent parts as seen when looking in the direction indicated by the arrows from the broken line 10 10 in Fig. 8; Fig. 11 a detail sectional perspective view showing more clearly how the bottoms of the measuring hoppers are hinged and operate; Fig. 12 a detail longitudinal vertical sectional view as seen when looking in the direction indicated by the arrows from the broken lines 12 12 in Figs. 7 and 13; Fig. 12ª a detail view as seen from broken line $a\ a$ in Fig. 13; Fig. 13 a transverse vertical sectional view as seen when looking in the direction indicated by the arrows from the dotted lines 13 13 in Figs. 2, 8 and 12; Fig. 14 a detail transverse vertical sectional view similar to a portion of Fig. 13, but on an enlarged scale, the bottom of the measuring hopper being however shown in its lower or opened position instead of in its closed position as in said Fig. 13; Fig. 15 a detail transverse vertical sectional view showing the means of supporting and revolving the drying cylinder, and also showing some of the structural details of said cylinder, as shown when looking in the direction indicated by the arrows by the dotted lines 15 15 in Fig. 2; Fig. 15ª a detail elevation on an enlarged scale of the means for holding and adjusting the wings in the drying cylinder; Fig. 16 a detail vertical sectional view through the driving and supporting mechanism for the drying cylinder as seen when looking in the direction indicated by the arrows from the broken line 16 16 in Fig. 15; Fig. 17 a small plan view of the interior of the drying cylinder as it would appear if it were cut open and laid out flat, thus illustrating the positions of the lifting and conveying wings or flights secured therein; Fig. 18 a longitudinal vertical section view at the front or receiving end of the drying cylinder, as seen from the position indicated by the broken lines 18 18 in Figs. 1 and 19, showing the relation of the receiving hopper and exhaust fan thereto; Fig. 19 a transverse vertical sectional view as seen when looking in the direction indicated by the arrows from the broken line 19 19 in Figs. 2 and 18; Fig. 20 a detail vertical sectional view through the steering gear as seen when looking in the direction indicated by arrows from the broken line 20 20 in Fig. 6; Fig. 21 a longitudinal vertical sectional view through the heating furnace as seen when looking in the direction indicated by the arrows from the dotted line 21 21 in Fig. 22; Fig. 22 a transverse vertical sectional view through the furnace as seen when looking in the direction indicated by the broken line 22 22 in Figs. 2 and 21; Fig. 23 a longitudinal vertical sectional view through the melting furnace as seen when looking in the direction indicated by the arrows from the broken line 23 23 in Fig. 22; Fig. 24 a view similar to Fig. 22 but illustrating an alternative construction wherein the heating and melting is all accomplished from a single combustion chamber; Fig. 25 a detail sectional view illustrating the lining of the top of the furnace or combustion chamber and the means of securing the same in place, and Fig. 26 a detail sectional view illustrating the lining of the sides and ends thereof and the means of securing the same in place.

In my improved machine a main frame 21 is mounted at or near its rear end by means of suitable arms 22 upon a rear axle 23 carried by suitable wheels 24; and, at the front end, by means of a fifth wheel 25 and bolster 26 upon an axle 27 carried by suitable wheels 28. Upon this frame is an engine 31 of any suitable character which drives a main or engine shaft 32. Upon this shaft is a sprocket wheel 33 having a clutch member 34 with which a sliding clutch member 35 is adapted to engage, the latter being splined upon the shaft, and shiftable in any convenient way, as by shifting lever 36. From sprocket wheel 33 runs a sprocket chain 37 which, through sprocket wheel 38, drives shaft 39. On the end of the shaft 39 is a bevel gear wheel 40 which meshes with a corresponding bevel gear wheel 41 on shaft 42. From sprocket wheel 43 on shaft 42 a sprocket chain 44 runs to a sprocket wheel 45 on end of shaft 46. On the opposite end of shaft 46 is a bevel pinion 51 which engages with two bevel gear wheels 52 and 53 running loosely on the shaft 54. Each of these bevel gear wheels has a clutch face or member and two other clutch members 55 and 56 are adapted to engage therewith, respectively. Said clutch members are operated, as by the shifting levers 55' and 56', so that shaft 54 may be driven in either direction; or, when both the clutches are disengaged, said shaft will remain at rest. The shaft 54 is the shaft to the mixer, by which the material, after it has been suitably treated, is mixed and reduced to the desired condition previous to final delivery for use upon the street. This mixer and conveyer will be described in detail hereinafter. Also on shaft 32, is a sprocket wheel 61, having clutch member 62, and a second clutch member 63 is splined onto the shaft and adapted to be operated by shifting lever 63'. From sprocket wheel 61 a sprocket chain 64 runs to a sprocket wheel 65 on end of shaft 66, and this shaft 66 has upon its other end a spur pinion 67 which engages with spur pinion 68 mounted on countershaft 69, which pinion engages with spur rim 70 on the rotary drying cylinder 71, and thus imparts motion to said rotary drying cylinder.

The rotary drying cylinder 71 has surrounding it annular tracks 72 resting upon anti-friction rollers 73 carried by suitable bearings upon the frame work 21, and said cylinder is thereby enabled to easily rotate in operation. Within the rotary drying cylinder 71 are agitating and conveying wings or flights 75, by which the material is continuously raised up and allowed to fall during its progress through the cylinder; and, by reason of their inclined position, these flights also serve to convey the material longitudinally of the cylinder, and finally deliver it through its discharge end. As best shown in Fig. 15, these flights are of a somewhat peculiar construction, and are adjustable, and are so attached that the adjustment can be effected from the exterior of the cylinder. As will be observed the cylinder walls are of considerable thickness and embody non-conducting material. At the point where each of the conveyer flights is attached, a cup 76 is provided, and within this cup the flight-attaching bolt 77 is placed, so that the end of the bolt, as well as its nut 78, are below the exterior surface of the cylinder. When it is desired to shift the position of the flights, all that is necessary to do, is to loosen the nut 78 slightly, then turn the bolt 77 carrying flight 75 to the desired position, and then re-tighten nut 78. Suitable indicating marks may be made upon the outer end of the bolt, as shown in Fig. 15ᵃ, so that the adjustment can be effected without entering the interior of the cylinder. The mark crossing the end of the bolt 77 being parallel with the body of the wing or flight attached to its inner end, and the indicating marks on the adjacent surface extending throughout 90° (from horizontal to perpendicular), it is easily possible to adjust these wings or flights accurately, from the exterior of the cylinder, by means of the bolts upon which they are mounted. The rotary drying cylinder 71 is open-ended, and for the greater portion of its length is imperforate. For a short distance near its discharge end, however, the shell of said cylinder is composed of perforated or reticulated material, so as to form a screen. By this means the material as it is discharged is separated into two grades. The finer portion will pass out through the perforations of the screen-like portion 71', while the coarser material will pass over said screen-like portion and be discharged from the extreme end. As elsewhere described, there are two receiving hoppers for this material, one of which is positioned below the screen portion of the cylinder, and the other just at its end, so that the material is received separately therein.

There is also upon the main engine shaft 32 a bevel gear wheel 81, which has a clutch member 82 forming part thereof or connected thereto, and another clutch member 83 is splined to the shaft and adapted to engage therewith, being operated by an ordinary operating lever 83'. The bevel gear wheel 81 engages with a corresponding bevel gear wheel 85 on a shaft 86, and said shaft carries a sprocket wheel 87, from which (see Fig. 3) a sprocket chain 88 runs to a sprocket wheel 89 on shaft 90. From a second sprocket wheel 91 a sprocket chain 92 runs to a sprocket wheel 93 on a shaft 94. Said shaft 94 carries a spur pinion 95 which meshes with a spur gear wheel 96 on shaft 97, which is the upper elevator shaft. An elevator 98 runs on a suitable wheel on this shaft and over another suitable wheel in the elevator boot carried by shaft 99. The elevator boot 100 is carried below frame 21 and extends nearly to the surface of the ground, and is adapted to receive the untreated material as it comes to the machine. It has a hopper-like mouth 101 into which the material is thrown, and within said hopper, above that portion into which the elevator 98 extends, is a coarse screen 102, onto which the material is first thrown, and which will separate therefrom any stones too large to properly become a part of the paving mixture. The screen being set at something of an inclination, such stones will roll off and fall back on to the ground. This inclination is indicated by the position of the screen bars or screen-supporting frame-ends 103, as shown in Figs. 2 and 3. A portion of this screen is broken away to show the interior of the hopper in Fig. 1. The shaft 90 also carries a pulley 111 from which a belt 112 runs to a pulley 113 on fan shaft 114. As shown especially in Figs. 1, 3, 18 and 19, the fan casing 116 within which the fan 115 is contained is located to one side of the drying cylinder, closely adjacent to its front or receiving end; and the eye in said fan casing communicates by means of a short pipe 117 with a casing 118 which surrounds said front or receiving end of the drying cylinder. As the rear or discharging end of said drying cylinder 71 communicates with the combustion chamber of the furnace, the effect is, when the machine is in operation, that the fan will draw the products of combustion longitudinally through said drying cylinder, thus giving the necessary heat therein for the drying operation, and the same will be discharged through the nozzle 119 of the fan, which thus serves as the smoke-stack to the apparatus.

The elevator 98 delivers into a hopper 121 carried by the casing 118, and said hopper has a delivery spout 122 which extends to within the open front end of the drying cylinder 71. Between said hopper and said spout is the door or valve 123, which, as shown, is hinged to swing inwardly under the force of the incoming material, but which will swing outwardly by gravity, and close, when no material is passing, and thus prevent the ingress of air through the hopper. By this means the draft from the furnace through the drying cylinder to the fan is insured. Access to the casing 118 and the front end of the cylinder is provided for by means of a door 124 on the opposite side of said casing from the fan housing.

The rear or discharging end of the rotary drying cylinder 71, as well as its front end, extends into an inclosing casing. This casing 131 (see especially Figs. 1, 2, 3, 8, 12, 13 and 21) communicates with the combustion chamber of the furnace by means of a short pipe 132 through which the products of combustion pass from said combustion chamber into said inclosing casing, and thence into and through the rotary drying cylinder, as has already been described. As best shown in Figs. 2, 7, 8, 12, 13 and 14, the casing 131 develops at its lower side into discharge spouts 133 and 134, which are arranged, respectively, to deliver the finer and coarser grades of dried material into the weighing hoppers below. The bodies 135 and 136 of these weighing hoppers are pivotally mounted on rock shafts 137 and 138, but the bottoms 139 and 140 are keyed to said rockshafts, as is best shown in Figs. 14 and 11. Both of these hoppers being alike, a description of one will suffice for both; and, therefore, I will describe in detail that one which is shown in Fig. 14. In said figure the fine material comes through the screen portion 71' of drying cylinder 71 and falls through discharge nozzle 133 into weighing drum 135, and rests upon the bottom 139—the latter being at the time in closed position, as indicated by dotted lines in Fig. 14, and by full lines in Fig. 13. The weigher hopper is held in the position indicated by dotted lines until completely loaded by weight 141 on arm 143, which arm is rigidly secured to said weigher hopper. On the opposite side of weigher hopper 135 is a pivoted catch 145 mounted on pivot 147 in housing 149 rigidly attached to weigher hopper 135.

The catch 145 is provided with an arm 151 extending at substantially right angles therewith, which is adapted, as the weigher hopper descends, to come in contact with a suitable projection 153 (in the construction shown this projection is a flange of one of the frame beams), and thus disengage said catch from the bottom 139, and allow the latter to descend to the position shown by full lines in Fig. 14, and thus discharge the contents of said weigher hopper into the mixer. The movement of catch 145 and of weigher hopper 135 is limited by a second arm 155 which will come in contact with the side of said conveyer hopper. This catch apparatus is protected from dirt by a housing 157. The rock shaft 137 being keyed to the bottom 139 is moved therewith; and this, as will be presently described, is the means for manipulating the valves governing the flow of the melted bituminous material.

The bituminous material after being melted (as will be presently described) flows from the melting tank through pipes 161 and 162 to the measuring receptacles 163 and 164; and thence, by way of pipes 165 and 166 to the mixer. These pipes (see especially Figs. 12$^a$ and dotted lines in 13) preferably start from near the upper side of the melting tank, pass thence down inside the outer wall, and thence to the outside. At an intermediate point, within the inclosure, I place valves 291 and 292, the valve stems 291' and 292' extending to the outside. By this arrangement I am enabled to shut off the flow of melted bituminous material at a point where the residuum left in the pipes will not chill and clog them, as a considerable heat is maintained in the space wherein said valves are situated. As different qualities and conditions of sand, gravel or such like material require different quantities of melted bituminous material to form a proper mixture, I have provided means for adjusting the size of the measuring receptacles 163 and 164. This I have done, in the construction shown, by introducing (through stuffing boxes in the upper ends of said measuring receptacles) displacers 167 and 168, and I have made said displacers adjustable vertically by means of screws 169 and 170 engaging therewith. When a small amount of bituminous material is required, the appropriate displacer is moved downwardly within the measuring receptable, as is shown by the position of displacer 167 in Fig. 12; while, when a greater amount is required, the displacer is moved upwardly, as illustrated by the position of displacer 168 in Fig. 12. The discharge pipes 165 and 166 lead, respectively, to the points in the mixer just below the two weighing hoppers 135 and 136, so that the discharge of melted bituminous material may take place at the same points where said weighing hoppers discharge.

In order that the discharge of the two materials to be mixed may be simultaneous, I have provided a means whereby the descent of the weighing-hopper bottoms will actuate valves controlling the ingress and egress pipes to the measuring receptacles 163 and 164. As before, these two devices being substantially counterparts of each other, a description of one will answer for the description of both: The measuring receptacle 163 having been filled with the melted bituminous material, through its ingress pipe 161, the valve 161' whereof is at the time open, and it being ready to discharge through pipe 165, the valve 165' whereof is at the time closed, the weigher hopper 135 receives material from the drying cylinder 71 until the weight 141 is overcome, when said weigher hopper descends from the position shown by the dotted lines in Fig. 14 to the position shown by the full lines therein, and by its descent has disengaged catch 145, allowing bottom 139 to descend to the position indicated by full lines in Fig. 14, swinging the rock shaft 137, as will be readily understood. Rock shaft 137 carries an arm 171, from which a connecting rod 173 leads to an operating arm 175 on valve stem 177 of valve 165', the arrangement being such that as bottom 139 descends valve 165' will be opened. From a second arm 179 on valve stem 177, a connecting rod 181 leads to an arm 183 on valve stem 185 of valve 161', the arrangement being such that as hopper bottom 139 descends and valve 165' opens, valve 161' will be closed, thus preventing any further flow of melted bituminous material into the measuring receptacle 163 until the measured quantity already therein has been discharged, and the apparatus reset for a further operation. It is necessary to the efficient operation of the measuring receptacles that air shall flow into and out of them, as the melted bituminous material passes out or in, and I have therefore provided an air vent system consisting of a stand pipe 187 (the upper end of which extends above the supply of material in the melting tank) having branch pipes 188 and 189 leading to and entering the measuring receptacles at their upper ends.

As already briefly stated, the several classes of material are brought together within the receiving end of the mixer, the operating portions of which (as heretofore pointed out) are arranged to be driven by the shaft 54. This mixer consists of an open trough-like receptacle comprising, in its preferred form, an inner wall 191; and, over the most of its surface, an outer wall 192. At its receiving end it has a head 193, while the other or discharging end is open. The shaft 54 rests in bearings in head 193 and in a suitable bearing 194 secured at the open or discharging end. Upon this shaft at the receiving end, for a distance substantially equal to the width of the two weighing hoppers, and directly below said hoppers, a screw conveyer portion 195 is arranged. For a suitable distance, the shaft is then equipped with mixing blades 196 and 197, the blades 196 being also set at something of an angle enabling them to serve also as conveyer flights. At the discharge end of the mixer another section 198 of screw conveyer is placed. As before stated, by a manipulation of the driving gear, the shaft carrying the conveyer sections and mixing blades may be revolved in either direction, or permitted to remain at rest, at will. Consequently, any desired character of mixing may be had by a suitable manipulation of this apparatus. If the material is not being sufficiently mixed when the apparatus is running steadily at the regular speed, it can be reversed and the material retarded and given additional mixing; all as will be readily understood. In order to maintain the heat of the material while the same is being mixed, the exhaust pipe 199 leading from the engine connects with the space between the walls 191 and 192, and said space is thus utilized both as a heating chamber and as a muffler for the exhaust.

Figs. 21 to 26 inclusive illustrate the furnace construction. In Figs. 21, 22 and 23, two separate combustion chambers 201 and 202 are indicated. The chamber 201 is designed to supply the principal amount of heat which is supplied to the rotary drying cylinder, while the heat from combustion chamber 202 is primarily for the purpose of melting the bituminous material, although the heat therefrom also passes by way of a recess 203 (see Fig. 23) to the pipe 132, and thence into the rotary drying cylinder 71, together with the products of combustion from combustion chamber 201. As shown most plainly in Fig. 23 the melting tank is divided into two compartments 204 and 205 by a perforate partition 206. The lumps of bituminous material are introduced through inlet opening 207 to compartment 204, and the material cannot pass to compartment 205 until it is melted and thus capable of passing through the perforations in partition 206. The pipes 161 and 162 lead from a compartment 205 to the measuring receptacles heretofore described, and the inlets to said pipes (within the compartment 205) are covered by a screen 208 in order to exclude impurities which might clog the pipes or valves. The roof wall 209 of combustion chamber 201 is protected by a considerable thickness of asbestos sheets 210, which are secured in place by bolts 211, after which a plastering of fire proof cement 212 is applied. The side and end walls 213 of combustion chambers 201 and 202 are likewise protected by a thinner layer of asbestos sheets 214 (see Fig. 26), and inside of these are placed fire brick 215, which are held to wall 213 by bolts 216. The heads of said bolts are protected by being placed in recesses in the adjacent surfaces of the bricks, which recesses are afterward filled with suitable plastic fire-proof material 217.

In Fig. 24 I have shown an alternative construction, in which there is a single combustion chamber, while the melting receptacle extends over its top. When this construction is employed, the lumps of bituminous material are introduced, through opening 221, to the portion of the melting chamber which is directly over the combustion chamber, and the melted bituminous material flows over wall 222 to a chamber similar to compartment 204 of the first described construction. This construction illustrated in Fig. 24 is preferable where sufficient heat can be obtained thereby, as it is of course more economical to maintain a fire in one combustion chamber than in two. In case of very heavy and rapid work, however, it will probably be necessary to have the two combustion chambers, as illustrated in the other figures.

The main or engine shaft 32 extends to both sides of the engine 31; and, upon that portion on the opposite side of the engine from that bearing the mechanism which has already been described I have placed a fly wheel 231; and also, upon its extreme end, a bevel pinion 232. There is introduced between the fly wheel and the pinion a friction clutch 233, which is operated by the ordinary shifting lever 234. The pinion 233 engages with a bevel gear wheel 235 on a countershaft 236. Said countershaft has a spur pinion 237 which engages with a spur gear wheel 238 on a shaft 239 extending transversely of frame 21. Said shaft 239 carries sprocket wheels 241, from which run sprocket chains 242 to sprocket wheels 243 secured to hubs of ground driving wheels 24, as is shown in Figs. 2, 3 and 13. This machine is therefore self-propelled, it only being necessary, when it is desired to move it from place to place, for the operative to throw the friction clutch 233 into engagement by suitable manipulation of the shifting lever 234.

The steering apparatus is best illustrated in Figs. 6 and 20, although its position is indicated in Figs. 1, 2 and 3. As is best shown in Fig. 20, the front wheels 28 are, as previously stated, carried by a bolster 26, connected by king bolt 26' to fifth wheel 25. bolster 26 has a rearwardly extending arm 251, which has upon its rear end (see Fig. 6) a segment 252 to which a cable 253 is connected. This cable runs over sheaves 254 and 255 to a winding drum 256 carried by vertical shaft 257. Said shaft also carries a spur gear 258 which meshes with a spur pinion 259 on the hand-wheel shaft 260, and upon the upper end of said last named shaft is the hand wheel 261 by means of which the steering gear may be manipulated, as will be readily understood.

The operation of this apparatus may be recapitulated as follows: The machine being properly positioned in reference to the work to be done, a fire is first made in the combustion chamber or chambers, and a supply of bituminous material placed in the melting compartment. A supply of the material (such as sand or gravel) which is to be mixed therewith is also provided at a point convenient to the front end of the machine. When the bituminous material has been introduced into the melting chamber, the other material is thrown into the hopper 101, and is carried by elevator 98 to hopper 121, whence it passes into the rotary drying cylinder 71. The products of combustion being, as before described, drawn through this rotary heating and drying cylinder, the same is thoroughly heated and raised to the desired temperature. When it reaches the discharge end of the cylinder, the finer material will fall through the screen section thereof into the weigher hopper beneath, while the coarser material will pass over the screen portion and be discharged from the open end of the cylinder into the other weigher hopper. As each weigher hopper receives the predetermined load, it will automatically discharge, as hereinbefore described, and, at the same time, will by means of the connection provided close the valve in the pipe leading to the melted bituminous-material-measuring receptacle, and open the valve in the pipe leading therefrom, thus enabling the predetermined charge of melted bituminous material to mix with the predetermined quantity of other material at the point where said materials enter the mixer. Said materials are thereupon operated upon by the mixer in the manner already described; and, when said mixed material emerges from the mixer, it is in condition to form the surface of the street. While two classes of material are treated by the said mixing apparatus, they are, to a considerable extent, treated separately, because the charges enter the mixer separately. The operatives are thereby enabled to select the material so far as is necessary, and use the same either as the substratum or top coating of the street, as the case may be. While to make a good street it is necessary that the materials be well mixed, it is also desirable that the substratum should be of the coarser material, while the finer material is employed in making the top or finishing coat. As before stated, this is a matter easily within the control of the operatives, as the material, while all mixed to some extent, will emerge from the mixer in a sufficiently separated condition to enable its proper manipulation and use. It is of course necessary that the coarser material, although forming the substratum of the pavement, should contain a certain amount of finer material in order that the interstices which would otherwise exist be properly filled.

Having thus fully described my said invention, what I claim as new, and desire to secure by Letters Patent, is:

1. The combination, in an apparatus for preparing paving material, of a rotary drying cylinder, a stationary inclosing casing at each end of said cylinder, a furnace communicating with the inclosing casing at the delivery end of said rotary drying cylinder, and a suction fan communicating with the chamber of the casing at the receiving end of said cylinder whereby the products of combustion from said furnace are drawn through said cylinder and discharged from the delivery nozzle of said fan, a receiving hopper delivering to said rotary drying cylinder, and an automatically opening and closing door arranged in the passage between the hopper and drying cylinder.

2. The combination, in an apparatus for preparing paving material, with a drying cylinder, of an automatically-acting weighing hopper for receiving the material from said cylinder, said hopper being provided with a counterbalancing weight whereby the portions of material may be adjustably predetermined, said hopper being also provided with a movable mottom and a latching mechanism therefor adapted to be operated when the predetermined weight of material is reached.

3. The combination, in an apparatus for preparing paving material, with a drying cylinder, of an automatically-acting weighing hopper for receiving the material from said cylinder, said hopper being provided with a counterbalancing weight whereby the portions of material may be adjustably predetermined, a pivoted discharging bottom to said hopper, a latching device for said bottom secured to the side of said hopper having an arm extending outwardly therefrom, and a strike with which said arm will come in contact and thus disengage said latch and release the bottom as the hopper descends upon reaching the predetermined weight, said hopper being also provided with a movable bottom and a latching mechanism therefor adapted to be operated when the predetermined weight of material is reached.

4. The combination, in an apparatus for preparing paving material, with means for drying and heating the body material of the pavement, of a furnace for melting the bituminous binder material, measuring devices for receiving the melted bituminous material, means for receiving and delivering measured quantities of heated body material, and connections between said delivering means and bitumen-measurer for automatically discharging the bitumen by the discharging action of the body material.

5. The combination, in an apparatus for preparing paving material, of a drying and heating apparatus for the body material, automatically-acting measuring devices for receiving and delivering said body material after being dried and heated, means for melting the bituminous binder material, measuring devices for the melted bituminous material, discharging devices for both materials arranged adjacent to each other, and connections between said discharging devices whereby they are caused to act synchronously, thereby discharging both materials simultaneously.

6. The combination, in an apparatus for preparing paving material, with the melting furnace for the bituminous material, of measuring receptacles connected with the melting chamber, valves for controlling the inflow and outflow of the melted material to said measuring receptacles, and means for adjusting the size of the containing chamber of such measuring receptacles whereby the quantity of melted bituminous material may be adjustably predetermined relatively to the body material with which it is to be mixed.

7. The combination, in an apparatus for preparing paving material, with the melting furnace for the bituminous material, of measuring receptacles connected with the melting chamber, valves for controlling the inflow and outflow of the melting material to said measuring receptacles, displacers within said measuring receptacles, and means for adjusting said displacers and thus varying the size of the containing chambers of said measuring receptacles.

8. The combination, in an apparatus for preparing paving material, of a drying and heating apparatus for the body material, automatically-acting measuring devices for receiving and delivering said body material after being dried and heated, means for melting the bituminous binder material, measuring devices for the melted bituminous binder material, measuring devices for both materials arranged adjacent to each other, valves for controlling the discharge of the melted bituminous material, and connections between the discharge closures of the measuring devices for the body material and said valves, whereby the operation of said closures will automatically operate said valves.

9. The combination, in an apparatus for preparing paving material, of a melting furnace for bituminous binding material, a measuring receptacle into which such melted material will flow, a pipe leading from the melting receptacle to the measuring receptacle, a chamber adapted to be heated between the melting receptacle and the measuring receptacle, a valve in the pipe within the heated chamber, and a valve stem extending from said valve through the wall of the chamber whereby the valve within the chamber can be operated from outside the chamber.

10. The combination, in an apparatus for preparing paving material, of a drying and heating apparatus for the body material, a pivotally mounted receiving hopper adapted to receive said material from said heating and drying apparatus, a discharging closure for said receiving hopper, a rock shaft to which said discharging closure is rigidly connected, an arm on said rock shaft, a measuring receptacle for melted bituminous material, a pipe leading into said measuring receptacle, a pipe leading from said receptacle, a valve in each of said pipes, and connections between the arm on the rock shaft of the hopper closure and arms on the stems of said valves, whereby the valve of the inlet pipe is closed and the valve of the discharge pipe opened synchronously with the opening of the hopper closure.

11. The combination, in an apparatus for preparing paving material, of a drying and heating element for the body material, a melting element for the bituminous material, measuring receptacles into which the material from said elements respectively pass and arrange to discharge at a common point, a mixer arranged to receive said discharge and mix the materials and convey them to the point of final discharge for use, and connections between the measuring element for body material and binding material whereby the dumping operation of one will cause a corresponding operation of the other.

12. The combination, in an apparatus for preparing paving material, of a drying and heating element for the body material, a melting element for the bituminous material, measuring receptacles into which the material from said elements respectively pass and arranged to discharge at a common point, a mixer arranged to receive said discharge and mix the materials and convey them to the point of final discharge for use, said mixer having a double wall and a pipe leading from the exhaust of the engine to the space between said double wall, and intermediate connections between the measuring elements for body material and binding material whereby the dumping operation of one will cause a corresponding operation of the other.

13. The combination, in an apparatus for preparing paving material, of a drying and heating element for the body material, a melting element for the bituminous material, measuring receptacles into which the material from said elements respectively pass and arranged to discharge at a common point, a mixer arranged to receive said discharge and mix the materials and convey them to the point of final discharge for use, said mixer shaft being provided with a double drive gearing whereby it may be caused to revolve in either direction or permitted to remain idle at will while the remainder of the apparatus is in operation.

14. The combination, in an apparatus for preparing paving material, of a heating and drying cylinder for the paving body material, a heating and melting furnace having communication with the interior of said drying cylinder through which the products of combustion will pass, said heating and melting furnace being provided with a melting chamber divided into two compartments, and a delivery conduit leading from said melting chamber whereby the melted paving binder material may be conveyed to and mixed with the paving body material coming from the drying and heating chamber.

15. The combination, in an apparatus for preparing paving material, of a frame, carrying wheels upon which said frame is mounted, steering apparatus for said wheels, an engine mounted on said frame, a rotary drying cylinder also mounted on said frame, power connections between said engine and said cylinder, stationary casings inclosing the two ends of said cylinder respectively, a heating and melting furnace also mounted on said frame, a passage connecting the combustion chamber of said furnace and the casing inclosing the rear end of said cylinder, a suction fan also mounted on said frame, a connection between said suction fan and the casing inclosing the front end of said cylinder, and power connection between said engine and said fan.

16. The combination, in an apparatus for preparing paving material, of a frame, carrying wheels upon which said frame is mounted, an engine mounted on said frame, a rotary drying cylinder also mounted on said frame, power connections between said engine and said cylinder, stationary casings inclosing the two ends of said cylinder respectively, a heating and melting furnace also mounted on said frame, a passage connecting the combustion chamber of said furnace and the casing inclosing the rear end of said cylinder, a suction fan also mounted on said frame, a connection between said suction fan and the casing inclosing the front end of said cylinder, power connections between said engine and said fan, the casing inclosing the front end of the cylinder being provided with a receiving hopper, and an elevator positioned adjacent to said receiving hopper and adapted to elevate material and discharge the same thereinto.

17. The combination, in an apparatus for preparing paving material, of a frame, carrying wheels upon which said frame is mounted, an engine mounted on said frame, a rotary drying cylinder also mounted on said frame, power connections between said engine and said cylinder, stationary casings inclosing the two ends of said cylinder respectively, a heating and melting furnace also mounted on said frame, a passage connecting the combustion chamber of said furnace and the casing inclosing the rear end of said cylinder, a suction fan also mounted on said frame, a connection between said suction fan and the casing inclosing the front end of said cylinder, power connections between said engine and said fan, the casing inclosing the front end of the cylinder being provided with a receiving hopper, an elevator positioned adjacent to said receiving hopper and adapted to elevate material and discharge the same thereinto, measuring receptacles arranged adjacent to the rear end of the heating and drying cylinder, and other measuring receptacles connected to the melting chamber of the furnace, said several measuring receptacles being provided with a discharge means leading to a common point.

18. The combination, in an apparatus for preparing paving material, of a frame, carrying wheels upon which said frame is mounted, an engine mounted on said frame, a rotary drying cylinder also mounted on said frame, power connections between said engine and said cylinder, stationary casings inclosing the two ends of said cylinder respectively, a heating and melting furnace also mounted on said frame, a passage connecting the combustion chamber of said furnace and the casing inclosing the rear end of said cylinder, a suction fan also mounted on said frame, a connection between said suction fan and the casing inclosing the front end of said cylinder, power connections between said engine and said fan, the casing inclosing the front end of the cylinder being provided with a receiving hopper, an elevator positioned adjacent to said receiving hopper and adapted to elevate material and discharge the same thereinto, measuring receptacles arranged adjacent to the rear end of the heating and drying cylinder, other measuring receptacles connected to the melting chamber of the furnace, said several measuring receptacles being provided with a discharge means leading to a common point, and a mixer located at said common point and adapted to receive and mix the material from said measuring receptacles.

19. In an apparatus for preparing paving material, the combination of a drier and heater provided with means at its discharge end for separately delivering two grades of dried and heated body material, two automatically operating dumping devices arranged in position to receive the two grades of body material, a mixer arranged in position to receive the discharges from both of said dumping devices, means for melting a supply of bitumen, two measuring devices into which the bitumen melter discharges, and connections between each body material dumper and one of the bitumen measurers whereby correlative actuation of a body material dumper and a bitumen measurer is produced, the said bitumen measurer being arranged to discharge into the mixer.

In witness whereof, I, have hereunto set my hand and seal at Indianapolis, Indiana, this thirteenth day of February, A. D. one thousand nine hundred and nine.

HERMAN J. RUFLI. [L. S.]

Witnesses:
CHESTER BRADFORD,
THOMAS W. MCMEANS.